(12) United States Patent
Maruyama et al.

(10) Patent No.: US 9,656,644 B2
(45) Date of Patent: May 23, 2017

(54) BRAKING CONTROL DEVICE

(71) Applicant: ADVICS CO., LTD., Kariya (JP)

(72) Inventors: Masaki Maruyama, Nagoya (JP); Kazutaka Noro, Kariya (JP); Tatsushi Kobayashi, Kariya (JP); Yasunori Sakata, Toyota (JP); Akitaka Nishio, Kariya (JP); Masaaki Komazawa, Miyoshi (JP); Yusuke Kamiya, Okazaki (JP); Kiyoyuki Uchida, Konan (JP)

(73) Assignee: ADVICS CO., LTD., Kariya, Aichi-Pref (JP)

( * ) Notice: Subject to any disclaimer, the term of this patent is extended or adjusted under 35 U.S.C. 154(b) by 390 days.

(21) Appl. No.: 14/397,313

(22) PCT Filed: Apr. 26, 2013

(86) PCT No.: PCT/JP2013/062473
§ 371 (c)(1),
(2) Date: Oct. 27, 2014

(87) PCT Pub. No.: WO2013/162022
PCT Pub. Date: Oct. 31, 2013

(65) Prior Publication Data
US 2015/0321652 A1     Nov. 12, 2015

(30) Foreign Application Priority Data

Apr. 27, 2012   (JP) .................................. 2012-102376

(51) Int. Cl.
*F15B 7/00* (2006.01)
*B60T 11/16* (2006.01)
(Continued)

(52) U.S. Cl.
CPC ............... *B60T 11/16* (2013.01); *B60T 7/042* (2013.01); *B60T 8/3265* (2013.01);
(Continued)

(58) Field of Classification Search
CPC ...... B60T 7/042; B60T 8/3265; B60T 8/4077; B60T 11/103; B60T 11/20; B60T 13/662
(Continued)

(56) References Cited

U.S. PATENT DOCUMENTS

| 2008/0185241 A1* | 8/2008 | Isono ..................... B60T 8/3655 |
| | | 188/151 R |
| 2008/0229741 A1* | 9/2008 | Isono ..................... B60T 7/042 |
| | | 60/581 |

FOREIGN PATENT DOCUMENTS

| JP | 2004-268868 A | 9/2004 |
| JP | 2006-219101 A | 8/2006 |
| JP | 2012-16984 A | 1/2012 |

OTHER PUBLICATIONS

International Search Report (PCT/ISA/210) mailed on Jul. 23, 2013, by the Japanese Patent Office as the International Searching Authority for International Application No. PCT/JP2013/062473.

* cited by examiner

*Primary Examiner* — Thomas E Lazo
*Assistant Examiner* — Daniel Collins
(74) *Attorney, Agent, or Firm* — Buchanan Ingersoll & Rooney PC

(57) ABSTRACT

The braking control device for controlling a master cylinder device includes a housing, an output piston, an input piston, a separation chamber opening and closing portion, and a driving hydraulic pressure generating portion, and is provided with an operation control for controlling the master cylinder device in an operation force operating state (regulator mode) in which the output piston is driven by operation force on a brake operation member and in a driving hydraulic pressure operating state (linear mode) in which the output piston is driven by driving hydraulic pressure from the driving hydraulic pressure generating portion; a brake opera- (Continued)

tion judgment portion for judging the presence or absence of a brake operation and the probability thereof and a state transition limiter for limiting at least one of state transitions between the operating states when the presence of the brake operation and possibility thereof is determined.

5 Claims, 4 Drawing Sheets

(51) Int. Cl.
*B60T 11/10* (2006.01)
*B60T 7/04* (2006.01)
*B60T 13/66* (2006.01)
*B60T 13/68* (2006.01)
*B60T 8/32* (2006.01)
*B60T 8/40* (2006.01)
*B60T 11/20* (2006.01)

(52) U.S. Cl.
CPC ........... *B60T 8/4077* (2013.01); *B60T 11/103* (2013.01); *B60T 11/20* (2013.01); *B60T 13/662* (2013.01); *B60T 13/686* (2013.01)

(58) Field of Classification Search
USPC .......................................................... 60/533
See application file for complete search history.

Cylinder opening side ←——————→ Cylinder bottom surface side

BRAKING CONTROL DEVICE

TECHNICAL FIELD

This invention relates to a braking control device suitably adapted to a vehicle brake system having both hydraulic brake device and regeneration brake device.

BACKGROUND ART

It is becoming popular for a hybrid vehicle which uses both engine and motor/generator as a running drive source or for an electric vehicle which uses the motor/generator as a driving drive source to accumulate electric energy regenerated from the kinetic energy by the motor/generator during braking operation thereby to improve the fuel efficiency. In this sense, the motor/generator is considered to be the regeneration brake device which applies regeneration braking force to the driving vehicle wheels. Since sufficient braking force cannot be obtained by the regeneration brake device alone, normally a device for generating a basic hydraulic pressure braking force by a conventional hydraulic brake device, a hydraulic brake device which is driven by the operation fluid supplied from the master cylinder device is provided at each vehicle wheel to supplement the insufficient braking force.

According to thus structured vehicle brake system, the regeneration braking force obtained by the regeneration brake device changes the amount depending on some factors such as the battery charged state. Accordingly, the hydraulic braking force to be generated by the hydraulic brake device cannot be determined only by the depression amount (operation amount) of the brake pedal by an operator and variably controlling the hydraulic braking pressure is required. For this type of device suitable for variable control, an example of such device is disclosed in a Patent Document 1, in which an input piston and an output piston are provided and the relative distance therebetween can be variably changed.

According to the master cylinder device in the Patent Document 1, a housing, a pressurizing piston (output piston), an input piston and a reaction force applying mechanism are provided. In addition thereto, an operation force depending pressure realizing mechanism is also equipped. Normally the master cylinder device is operated under the driving hydraulic pressure operating state where the master cylinder pressure is generated by pressurizing the operation fluid in the pressure chamber by the pressurizing piston depending on the hydraulic pressure of a high pressure source (driving hydraulic pressure generating portion). On the other hand in a state that the pressure in the high pressure source is insufficient, the operation force depending pressure realizing mechanism stops operation of the reaction force applying mechanism and at the same time allows the transmission of operation force from the input piston to the pressurizing piston. Then the pressurizing piston is operated depending on the operation force under the operation force operating state where the master master cylinder pressure is generated.

CITATION LIST

Patent Document

Patent Document 1: JP2012-16984 A

SUMMARY OF INVENTION

Technical Problems to be Solved by the Invention

However, as the state where the master cylinder device is operated under the operation force operating state, in addition to a failure of the device, another case such as ECU (electronic control device) is not activated may be considered. It is noted here that the case where the ECU is activated by the depression of the brake pedal by the operator of the vehicle is assumed. In this case, if the operation state of the master cylinder device is shifted from the operation force operating state to the driving hydraulic pressure operating state, the rigid braking operation feeling may be suddenly deteriorated due to the opening of the separation chamber.

Further, under a vehicle running state, in order to improve the fuel efficiency by generating a regeneration braking force, the master cylinder device is operated under the driving hydraulic pressure operating state and under the vehicle being stopped, the master cylinder device is operated under the operation force operating state in order to reduce a load on the high pressure source (for example, load on the electric motor and solenoid valves included in the high pressure source). It is noted here that the case where the vehicle is stopped by the depression of the brake pedal during the vehicle being running is assumed. If the operation state of the master cylinder device is shifted from the driving hydraulic pressure operating state to the operation force operating state, the rigid braking operation feeling may be suddenly increased due to the closing of the separation chamber.

As above explained two examples, if the master cylinder device is changed from the operation force operating state to the driving hydraulic pressure operating state or vice versa during the brake pedal being depressed, the rigid feeling of the braking operation varies depending on the opening or closing operation of the separation chamber. Therefore, a brake pedal depression feeling (operation feeling of a brake operation member) may be fared to be deteriorated.

Accordingly, this invention was made in consideration with the above-mentioned situation and the objective of the invention is to provide a braking control device which can improve the operation feeling of a brake operation member.

Solutions to the Problem

The braking control device according to the invention associated with a first aspect is characterized in that the braking control device is used for controlling a master cylinder device which includes a tubular housing, a front side of which is closed, an output piston provided within the housing so that a pressure chamber for pressurizing an operation fluid to be supplied to a hydraulic brake device provided at each vehicle wheel is formed at a front side of the output piston within the housing and defined by the output piston, an input piston provided rearward of the output piston within the housing so that a separation chamber is formed at a rear side of the output piston, a rear end portion of the input piston being connected to a brake operation member and the input piston being movable in response to an operation force applied to the brake operation member, a separation chamber opening and closing portion which changes over a state of the separation chamber between an open state where the operation fluid can flow in or out from the separation chamber and a closed state where the operation fluid cannot flow in or out from the separation chamber and a driving hydraulic pressure generating portion for generating a driving hydraulic pressure in a driving hydraulic pressure chamber defined by the housing and the output piston. The braking control device includes an operation control means which controls the master cylinder device to be in an operation force operating state, where the output piston is driven together with the input piston by the operation force to have the separation chamber to be in the closed state by the separation chamber opening and closing portion and to be in a driving hydraulic pressure operating state, where the separation chamber is in the open state by the separation chamber opening and closing portion to drive the output piston by generating a driving hydraulic pressure in response to an operation amount of the brake operation member in the driving hydraulic pressure chamber by the driving hydraulic pressure generating portion, a brake operation judgment means for judging at least whether or not a braking operation by the brake operation member is being performed, or whether or not the braking operation will be performed within a predetermined time period and a state transition limiting device for limiting at least one of a state transition from the operation force operating state to the driving hydraulic pressure operating state of the master cylinder device and a state transition from the driving hydraulic pressure operating state to the operation force operating state, when the brake operation judgment means judges at least that the braking operation by the brake operation member is being performed or that the braking operation will be performed within the predetermined time period.

The braking control device according to a second aspect of the invention is characterized in that in addition to the feature of claim 1, the state transition limiting device one of the state transitions from the operation force operating state to the driving hydraulic pressure operating state of the master cylinder device and from the driving hydraulic pressure operating state to the operation force operating state, regardless of a limiting of the state transition being performed or not, when the brake operation judgment means judges at least that the braking operation by the brake operation member is not being performed or that the braking operation will not be performed within the predetermined time period.

The braking control device according to a third aspect of the invention is characterized in that in addition to the feature of the above claim 1 or claim 2, the driving hydraulic pressure generating portion generates the driving hydraulic pressure in the driving hydraulic pressure chamber in response to the operation amount of the brake operation member when the transition state from the operation force operating state to the driving hydraulic pressure operating state of the master cylinder device is limited by the state transition limiting means to hold the master cylinder device to be in the operation force operating state.

The braking control device according to a fourth aspect of the invention is characterized in that in addition to any feature of claims 1 through 3, the master cylinder device further includes a rear chamber defined by an inner peripheral surface of the housing and the output piston, the rear chamber being defined at a rear of the pressure chamber, a large diameter flange portion formed on the output piston and arranged in the rear chamber, the large diameter flange portion being slidably movably engaged with the inner peripheral surface of the housing, a reaction force chamber disposed at a front of the large diameter portion and formed by separating the rear chamber, the driving hydraulic pressure chamber disposed at a rear of the large diameter flange portion and formed by separating the rear chamber, a chamber to chamber communication passage connecting the separation chamber and the reaction chamber for absorbing a volume change of the separation chamber and the reaction chamber in response to an advance movement or a retreat movement of the output piston by transferring the operation fluid and a chamber to chamber communication passage communication cutting device which interrupts communication of the chamber to chamber communication passage when not energized and establishes communication thereof when energized.

The braking control device according to a fifth aspect is characterized in that the master cylinder device further includes a rear chamber defined by an inner peripheral surface of the housing and the output piston, the rear chamber being defined at a rear part of the pressure chamber, a large diameter flange portion formed on the output piston and arranged in the rear chamber, the large diameter flange portion being slidably movably engaged with the inner peripheral surface of the housing, a reaction force chamber disposed at a front of the large diameter portion and formed by separating the rear chamber, the driving hydraulic pressure chamber disposed at a rear part of the large diameter flange portion and formed by separating the rear chamber, a chamber to chamber communication passage connecting the separation chamber and the reaction force chamber for absorbing a volume change of the separation chamber and the reaction force chamber in response to an advance movement or a retracting movement of the output piston by transferring of the operation fluid and a chamber to chamber communication passage communication interrupting device which interrupts communication of the chamber to chamber communication passage under non-energized state thereof and establishes communication thereof under energized state thereof.

According to the braking control device associated with the first aspect of the invention, while an operator of the vehicle is operating a brake operation member or in case where the operator of the vehicle will most probably operate the brake operation member within a predetermined time period, at least one of the state transitions from the operation force operating state of the master cylinder device to the driving hydraulic pressure operating state and from the driving hydraulic pressure operating state to the operation force operating state is limited. Accordingly, the rigidity feeling change by operation of the brake operation member caused by opening and closing of the separation chamber can be avoided to improve the brake operation feeling.

According to the braking control device associated with the second aspect of the invention, the state transition limiting means allows at least one of the state transition from the operation force operating state to the driving hydraulic pressure operating state of the master cylinder device and the state transition from the driving hydraulic pressure operating state to the operation force operating state, regardless of a limiting of the state transitions, when the brake operation judgment means judges at least that the braking operation of the brake operation member was not made or that the braking operation will not be made within the predetermined time period. Accordingly, the master cylinder device can be operated under a proper operation state without deteriorating the operation feeling of the brake operation member.

According to the braking control device associated with the third aspect of the invention, the driving hydraulic pressure generating portion generates the driving hydraulic pressure in the driving hydraulic pressure chamber in response to the operation amount of the brake operation member when the transition state from the operation force operating state to the driving hydraulic pressure operating state of the master cylinder device is limited by the state transition limiting means to hold the master cylinder device to be in the operation force operating state. Accordingly, since the driving operation of the output piston can be assisted by the driving hydraulic pressure, the responsibility of application of braking force under the braking operation can be improved.

According to the braking control device associated with the fourth aspect of the invention, the master cylinder device is provided with a reaction chamber and a driving hydraulic pressure chamber defined by the outer peripheral surface of the output piston and is further provided with the chamber to chamber communication passage which connects the separation chamber and the reaction chamber and the chamber to chamber communication passage communication cutting device which interrupts communication of the chamber to chamber communication passage when not energized. According to this structure, since the master cylinder device becomes in the operation force operating state due to closure of the separation chamber when not energized, the issue to be solved in this invention becomes clearer. For example, under a vehicle running condition, in order to improve fuel efficiency, the regeneration braking force is generated. Therefore, the master cylinder device is considered to be operated under the driving hydraulic pressure operating state. Under such situation, when the chamber to chamber communication passage communication cutting device is assumed to be energized in response to the braking operation by the brake operation member, the master cylinder device changes the state from the operation force operating state to the driving hydraulic pressure operating state under the brake operation member being operated. Due to this state transition, the separation chamber is opened from the closed state. This will suddenly deteriorate the brake operation rigidity feeling. However, according to the invention of claim 4, the state transition from the operation force operating state to the driving hydraulic pressure operating state is limited as long as the operator of the vehicle is operating the brake operation member. Accordingly, the sudden deterioration of brake operation rigidity feeling can be prevented.

According to the braking control device associated with the fifth aspect of the invention, the master cylinder device is provided with a reaction chamber and a rear back chamber defined by the outer peripheral surface of the input piston and is further provided with the chamber to chamber communication passage which connects the separation chamber and the rear back chamber and the chamber to chamber communication passage communication cutting device which interrupts communication of the chamber to chamber communication passage when not energized. According to this structure, since the master cylinder device becomes in the operation force operating state due to closure of the separation chamber when not energized, the issue to be solved in this invention becomes clearer. For example, under a vehicle running condition, in order to improve fuel efficiency, the regeneration braking force is generated. Therefore, the master cylinder device is considered to be operated under the driving hydraulic pressure operating state. Under such situation, when the chamber to chamber communication passage communication cutting device is assumed to be energized in response to the braking operation by the brake operation member, the master cylinder device changes the state from the operation force operating state to the driving hydraulic pressure operating state under the brake operation member being operated. Due to this state transition, the separation chamber is opened from the closed state. This will suddenly deteriorate the brake operation rigidity feeling. However, according to the invention of claim 5, the state transition from the operation force operating state to the driving hydraulic pressure operating state is limited as long as the operator of the vehicle is operating the brake operation member. Accordingly, the sudden deterioration of brake operation rigidity feeling can be prevented.

BRIEF EXPLANATION OF ATTACHED DRAWINGS

EMBODIMENTS OF THE INVENTION

First Embodiment

Figure 1:
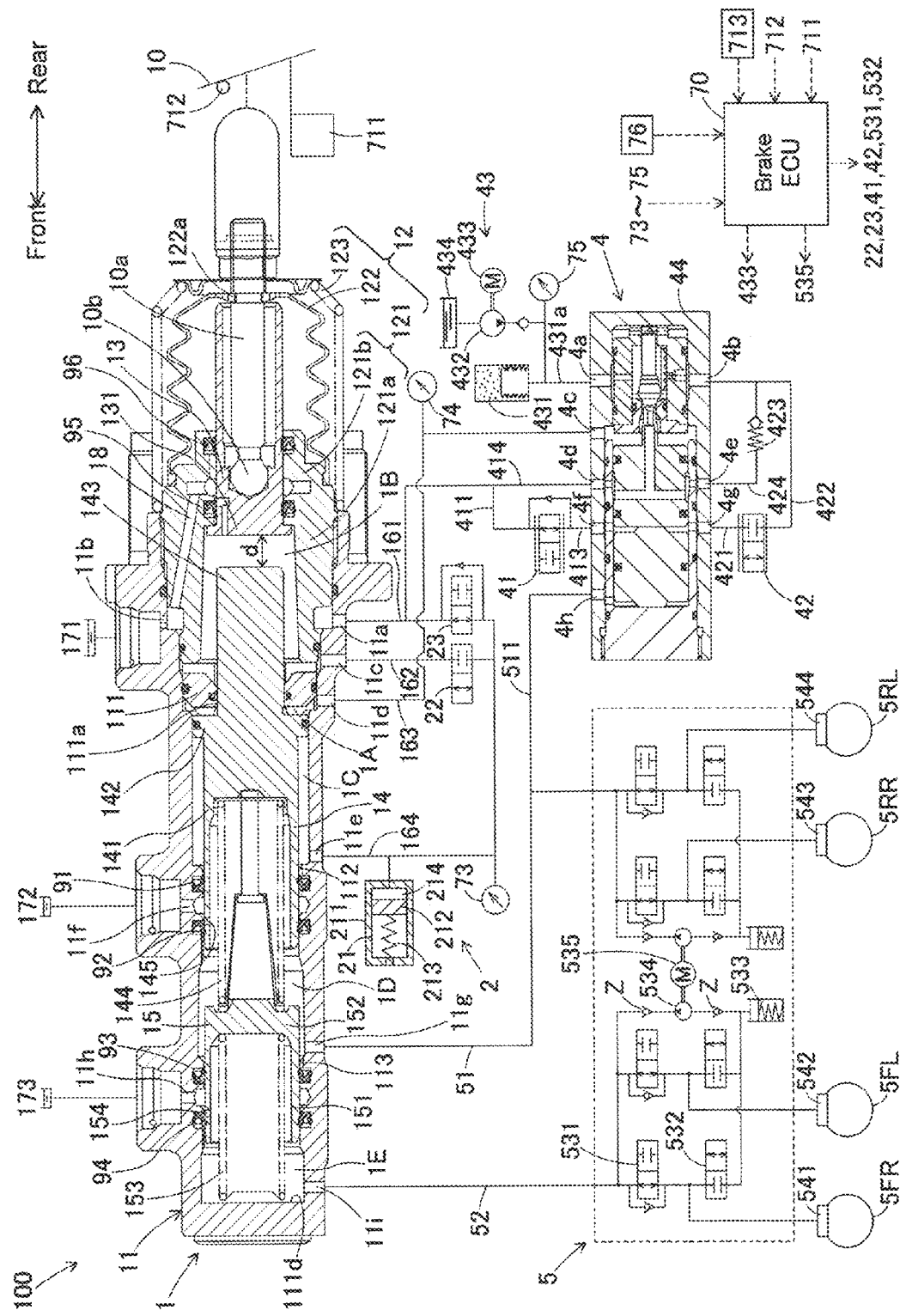
FIG. 1 is a view explaining the general structure of the master cylinder device including the braking control device according to a first embodiment of the invention.

The braking control device according to the first embodiment of the invention will be explained with reference to the attached drawings, FIGS. 1 through 3. FIG. 1 is a view explaining the general structure of the master cylinder device 100 including the braking control device according to a first embodiment of the invention. The master cylinder device 100 is installed in a hybrid vehicle and forms a brake system for a hybrid vehicle use with a regeneration brake device (not shown). As shown in FIG. 1, the master cylinder device 100 is formed mainly by a master cylinder 1, a reaction force generating device 2, separation lock valve 22, reaction force valve 23, a servo hydraulic pressure generating device 4, a hydraulic pressure control portion 5, a brake ECU 70 and various sensors 11 through 713 and 73 through 76.

The master cylinder 1 supplies the hydraulic pressure control portion 5 with the operation fluid and is formed mainly by a main cylinder 11, a cover cylinder 12, an input piston 13, a first master piston 14 and a second master piston 15. The main cylinder 11 and the cover cylinder 12 correspond to the housing of this invention and the first and the second master pistons 14 and 15 correspond to the output piston of this invention.

The main cylinder 11 is formed in a substantially bottomed cylinder shape having an opening at rear end thereof and a bottom surface at a front end. The main cylinder 11 includes therein an inner wall portion 111, which extends inwardly with a shape of flange. An inner circumferential surface of the inner wall portion 111 is provided with a through hole 111a at a central portion thereof. The main cylinder 11 includes therein a small diameter portion 112 (rear) and a small diameter portion 113 (front), at which an inner diameter of the main cylinder 11 is smaller than the rest, at locations forwardly of the inner wall portion 111. In other words, the small diameter portions 112, 113 project from the inner circumferential surface of a portion of the main cylinder 11. The first master piston 14 is provided inside the main cylinder 11 and is slidably movable along the small diameter portion 112 in the axial direction. Similarly, the second master piston 15 is provided inside the master cylinder 11 and is slidably movable along the small diameter portion 113.

The cover cylinder 12 includes an approximately cylindrical portion 121, a bellow tubular boots 122 and a cup-shaped compression spring 123. The cylindrical portion 121 is arranged at a rear end of the main cylinder 11 and is coaxially fitted into the opening of the main cylinder 11. An inner diameter of a front portion 121a of the cylindrical portion 121 is formed to be greater than an inner diameter of the through hole 111a. Furthermore, the inner diameter of the rear portion 121b is formed to be greater than an inner diameter of the front portion 121a.

The boots 122 is of bellow tubular shaped and is used for dust prevention purpose and is extendible or compressible in front and rearward direction. The front side of the boots 122 is assembled to be in contact with the rear end opening of the cylindrical portion 121. A through hole 122a is formed at a central portion of the rear of the boots 122. The compression spring 123 is a coiled type biasing member arranged around the boots 122. The front side of the compression spring 123 is in contact with the rear end of the main cylinder 11 and the rear side of the compression spring 123 is disposed with a preload adjacent to the through hole 122a of the boots 122. The rear end of the boots 122 and the rear end of the compression spring 123 are connected to an operating rod 10a. The compression spring 123 biases the operating rod 10a in a rearward direction.

The input piston 13 is configured to slidably move inside the cover cylinder 12 in response to an operation of a brake pedal 10 (brake operation member). The input piston 13 is formed in a substantially bottomed cylinder shape having a bottom surface at a front portion thereof and an opening at a rear portion thereof. A bottom wall 131 forming the bottom surface of the input piston 13 has a greater diameter than other parts of the input piston 13. The input piston 13 is arranged at the rear end portion 121b slidably and fluid-tightly movable in an axial direction and the bottom wall 131 is inserted into an inner peripheral side of the front portion 121a of the cylindrical portion 121.

The operating rod 10a operably connected to the brake pedal 10 is inserted into the input piston 13. A pivot 10b is provided at the tip end of the operating rod 10a and so that the pivot 10b can push the input piston 13 toward front side. The rear end of the operating rod 10a projects towards the outside through the opening of the input piston 13 and the through hole 122a of the boots 122, and is connected to the brake pedal 10. The operating rod 10a moves in response to the operation to the brake pedal 10. More specifically, when the brake pedal 10 is pressed, the operating rod 10a advances in a forward direction while compressing the boots 122 and the compression spring 123 in the axial direction. The input piston 13 also advances in response to the forward movement of the operating rod 10a.

The first master piston 14 is arranged in the inner wall portion 111 of the main cylinder 11 and is slidably movable in the axial direction. The first master piston 14 includes a pressurizing cylindrical portion 141, a flange portion 142 and a projection portion 143 in order from the front as a unit. The pressurizing cylindrical portion 141 is arranged coaxially within the main cylinder 11 at a location forward of the inner wall portion 111. The pressurizing cylindrical portion 141 is formed in a substantially bottomed cylinder shape having an opening at a front portion thereof and a bottom wall at a rear portion thereof. In other words, the pressurizing cylindrical portion 141 includes a clearance from the inner peripheral surface of the main cylinder 11 and is slidably in contact with the small diameter portion 112. A coil-shaped biasing member 144 is provided in an inner space of the pressurizing cylindrical portion 141 formed with the second master piston 15. The first master piston 14 is biased by the biasing member 144 in a rearward direction.

The flange portion 142 is formed to have a smaller diameter than the pressurizing cylindrical portion 141 and is slidably in contact with the inner peripheral surface of the main cylinder 11. A projection 143 is formed to have a smaller diameter than the flange portion 142 and is slidably and fluid-tightly in contact with the through hole 111a of the inner wall portion 111. The rear end of the projection 143 projects into the inner space of the cylindrical portion 121 passing through the through hole 111a and is separated from the inner peripheral surface of the cylindrical portion 121. The rear end surface of the projection 143 is separated from the bottom wall 131 of the input piston 13 and the separation distance "d" can be variable.

It is noted here that a first pressure chamber 1D is defined by the inner peripheral surface of the main cylinder 11, front side of the pressurizing cylindrical portion 141 of the first master piston 14 and a rear side of the second master piston 15. A rear chamber which is located further rearward of the first pressure chamber 1D is defined by the inner peripheral surface of the main cylinder 11, the small diameter portion 112, a front surface of the inner wall portion 111 and the outer peripheral surface of the first master piston 14. The flange portion 142 of the first master piston 14 separates the rear chamber in front and rear portions and the front portion is defined to be the reaction chamber 1C and the rear portion is defined to be the servo chamber 1A. The servo chamber 1A corresponds to the driving hydraulic pressure chamber of the present invention. A separation chamber 1B is defined by the inner peripheral surface of the main cylinder 11, a rear surface of the inner wall portion 111, an inner peripheral surface of the front portion 121a of the cylindrical portion 121, the projection 143 of the first master piston 14 and the input piston 12.

The second master piston 15 is coaxially arranged within the main cylinder 11 at a location forward of the first master piston 14 and is slidably movable in an axial direction to be in slidable contact with the small diameter portion 113. The second master piston 15 is formed as a unit by a tubular pressurizing cylindrical portion 151 in a substantially bottomed cylinder shape having an opening at a front portion thereof and a bottom wall 152 which closes the rear end of the pressurizing cylindrical portion 151. The bottom wall 152 supports the biasing member 144 with the first master piston 14. A coil-shaped biasing member 153 is disposed in the inner space of the pressurizing cylindrical portion 151 with an inner bottom surface 111d of the main cylinder 11. The second master piston 15 is biased by the biasing member 153 in a rearward direction.

A second pressure chamber 1E is defined by the inner peripheral surface of the main cylinder 11, the inner bottom surface 111d and the pressurizing cylindrical portion 151 of the second master piston 15.

Ports 11a to 11i, which connect the inside and the outside, are formed at the master cylinder 1. The port 11a is formed at the main cylinder 11 at a location rearward of the inner wall portion 111. The port 11b is formed at the main cylinder 11 opposite to the port 11a at approximately the same location in the axial direction. The port 11a and the port 11b are in communication through a clearance formed between the inner circumferential surface of the main cylinder 11 and the outer circumferential surface of the cylindrical portion 121. The port 11a is connected to a conduit 161. The port 11b is connected to a reservoir 171.

The port 11b is in communication with the separation chamber 1B via a passage 18 formed at the cylindrical portion 121 and the input piston 13. The fluid communication through the passage 18 is interrupted when the input piston 13 moves forward. In other words, when the input piston 13 moves forward, the separation chamber 1B and the reservoir 171 are disconnected from each other.

The port 11c is formed at a location forward of the port 11a and connects separation chamber 1B with a conduit 162. The port 11d is formed at a location forward of the port 11c and connects the servo chamber 1A with a conduit 163. The port 11e is formed at a location forward of the port 11d and connects the reaction force chamber 1C with a conduit 164.

The port 11f is formed between the sealing members 91, 92 of the small diameter portion 112 and connects a reservoir 172 with the inside of the main cylinder 11. The port 11f is in communication with the first pressure chamber 1D via a passage 144 formed at the first master piston 14. The passage 144 is formed at a location slightly rearward of the sealing member 92 so that the port 11f and the first pressure chamber 1D are disconnected from each other when the first master piston 14 moves forward.

The port 11g is formed at a location forward of the port 11f and connects the first pressure chamber 1D with a conduit 51. The port 11h is formed between the sealing members 93, 94 of the small diameter portion 113 and connects a reservoir 173 with the inside of the main cylinder 11. The port 11g is in communication with the second pressure chamber 1E via a passage 154 formed at the second master piston 15. The passage 154 is formed at a location slightly rearward of the sealing member 94 so that the port 11g and the second pressure chamber 1E are disconnected from each other when the second master piston 15 moves forward. The port 11i is formed at a location forward of the port 11h and connects the second pressure chamber 1E with a conduit 52.

A sealing member such as an O-ring and the like (see black dots in FIG. 1) are appropriately provided within the master cylinder 1. The sealing members 91, 92 are provided at the small diameter portion 112 and fluid-tightly contact the outer circumferential surface of the first master piston 14. Similarly, the sealing members 93, 94 are provided at the small diameter portion 113 and fluid-tightly contact the outer circumferential surface of the second master piston 15. Additionally, sealing members are provided between the input piston 13 and the cylindrical portion 121.

The stroke sensor 711 detects the operation amount of operation (a stroke amount) applied to the brake pedal 10 and transmits the detection result to the brake ECU 70. A brake switch 712 is a switch which detects whether the brake pedal 10 is depressed or not using a binary signal and the detected result is sent to the brake ECU 70. A curtesy switch 713 is a switch which detects whether a door (not shown) is open or closed and the detected result is sent to the brake ECU 70.

The reaction force generating device 2 is a device for generating a reaction force against the operation force of the brake pedal 10 depressed by the operator and is formed by mainly a stroke simulator 21. The stroke simulator 21 generates a reaction force hydraulic pressure in the separation chamber 1B and the reaction chamber 1C in response to the operation force of the brake pedal 10. The stroke simulator 21 is configured in such a manner that a piston 212 is fitted into a cylinder 211 while being allowed to slidably move therein and a reaction force hydraulic pressure chamber 214 is formed at a location forward of the piston 212, which is biased in the forward direction by a compression spring 213. The reaction force hydraulic pressure chamber 214 is connected to the reaction force chamber 1C via the conduit 164 and the port 11e, and is connected further to the separation lock valve 22 and the reaction force valve 23 via the conduit 164.

The separation lock valve 22 is an electromagnetic valve (linear valve) which is closed under non-energized state and opening and closing thereof is controlled by the brake ECU 70. The separation lock valve 22 is disposed between the conduit 164 and the conduit 162 for communication therebetween. The conduit 164 is connected to the reaction force chamber 1C via the port 11e and the conduit 162 is connected to the separation chamber 1B via the port 11c. The separation chamber 1B becomes in open state when the separation lock valve 22 opens and the chamber 1B becomes in closed state when the separation lock valve 22 closes. Accordingly, the conduits 164 and 162 correspond to the chamber to chamber communication passage of the invention which establishes communication between the separation chamber 1B and the reaction force chamber 1C. Further, the separation lock valve 22 corresponds to the chamber to chamber communication passage communication cutting device, as well as the separation chamber opening and closing portion of the present invention.

The separation lock valve 22 is closed under non-energized state and under this state, communication between the separation chamber 1B and the reaction chamber 1C is interrupted. Due to the closure of the separation chamber 1B, the operation fluid is nowhere to go and the input piston 13 and the first master piston 14 are moved integrally keeping a constant distance "d" therebetween. The separation lock valve 22 is open under the energized state and under such state, the communication between the separation chamber 1B and the reaction chamber 1C is established. Thus, the volume change in the separation chamber 1B and the reaction force chamber 1C due to the advancement and retreatment of the first master piston 14 can be absorbed by the transferring of the operation fluid.

The pressure sensor 73 detects the reaction force hydraulic pressure of the reaction force chamber 1C and is connected to the conduit 164. The pressure sensor 73 detects the pressures of the reaction force chamber 1C while the separation lock valve 22 is in a closed state. On the other hand, while the separation lock valve 22 is in an open state, the pressure sensor 73 detects the pressure in the hydraulically connected separation chamber 1B. The pressure sensor 73 sends the detected signal to the brake ECU 70.

The reaction force valve 23 is a normally-open-type electromagnetic valve in which the valve is open under a non-energized state and is configured so that opening and closing thereof is controlled by the brake ECU 70. The reaction force valve 23 is disposed between the conduit 164 and the conduit 161 for establishing communication therebetween. The conduit 164 is in communication with the reaction force chamber 1C via the port 11e and the conduit 161 is in communication with the reservoir 171 via the port 11a. Accordingly, the reaction force valve 23 establishes communication between the reaction force chamber 1C and the reservoir 171 under the no-energized state not to generate any reaction force hydraulic pressure but interrupts the communication therebetween to generate the reaction force hydraulic pressure under the energized state.

The servo pressure generating device 4 (corresponding to the driving hydraulic pressure generating portion of the invention) mainly includes a pressure decreasing valve 41, a pressure increasing valve 42, a high pressure supplying portion 43 and a regulator 44. The pressure decreasing valve 41 is a normally-open-type electromagnetic valve which opens when the valve is not energized and flow-rate therethrough is controlled by the brake ECU 70. One port of the pressure decreasing valve 41 is connected to the conduit 161 via a conduit 411, and the other port of the pressure decreasing valve 41 is connected to a conduit 413. More specifically, the one outlet/inlet port of the pressure decreasing valve 41 is in communication with the reservoir 171 via the conduits 411, 161, and ports 11a, 11b. The pressure increasing valve 42 is a normally-closed-type electromagnetic valve and is closed when the valve is in non-energized state. The flow-rate of the pressure increasing valve 42 is controlled by the brake ECU 70. One outlet/inlet port of the pressure increasing valve 42 is connected to a conduit 421, and the other outlet/inlet port of the pressure increasing valve 42 is connected to a conduit 422.

The high pressure supplying portion 43 is a portion to supply a highly pressurized operation fluid to the regulator 44. The pressure supplying portion 43 mainly includes an accumulator 431, a hydraulic pressure pump 432, a motor 433 and a reservoir 434.

The accumulator 431 is a tank in which the highly pressurized operation fluid is accumulated. The accumulator 431 is connected to the regulator 44 and the hydraulic pressure pump 432 via a conduit 431a. The hydraulic pressure pump 432 is driven by the motor 433 and supplies the accumulator 431 with the operation fluid accumulated in the reservoir 434 when the motor 433 is driven. The pressure sensor 75 disposed in the conduit 431a detects the pressure in the accumulator 431 and a detection signal corresponding to the detected value is sent to the brake ECU 70. The accumulator hydraulic pressure correlates with the accumulated operation fluid amount in the accumulator 431.

When the pressure sensor 75 detects that the accumulator hydraulic pressure decreases to a value equal to or lower than a predetermined value, the motor 433 is driven on the basis of a control signal from the brake ECU 70, and the hydraulic pressure pump 432 supplies the operation fluid to the accumulator 431 in order to recover a pressure energy to the value equal to or more than the predetermined value.

Figure 2:
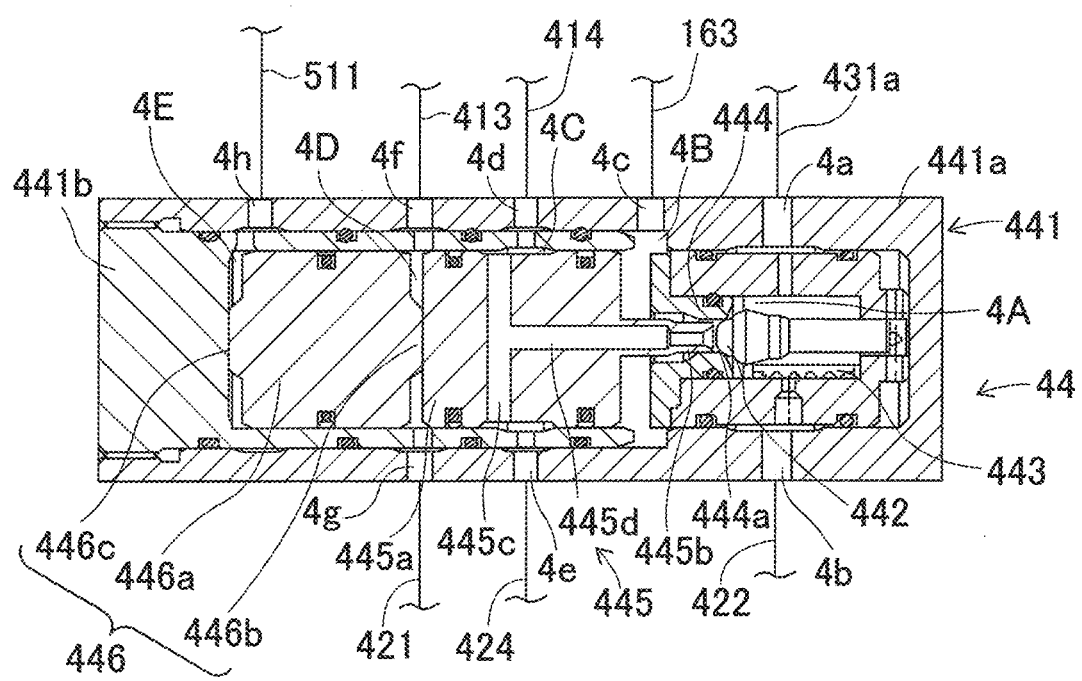
FIG. 2 is a partial cross sectional view illustrating a configuration of an inside of the regulator structuring a servo hydraulic pressure generating device (driving hydraulic pressure generating portion).

FIG. 2 is a partial cross sectional view illustrating a configuration of an inside of the regulator structuring a servo hydraulic pressure generating device (driving hydraulic pressure generating portion). As shown in FIG. 2, the regulator 44 is structured by a cylinder 441, a ball valve 442, a biasing portion 443, a valve seat portion 444, a control piston 445 and a sub-piston 446.

The cylinder 441 includes a cylinder case 441a formed in a substantially bottomed cylinder-shape having a bottom surface at one end thereof (at the right side in FIG. 2), and a cover member 441b closing an opening of the cylinder case 441a (at the left side thereof in FIG. 2). The cover member (441b) is formed to be substantially U-shaped in cross-section in FIG. 2. However, the regulator 44 is explained here with the cover member 441b as a column-shaped member, and a portion that closes the opening of the cylinder case 441a as the cover member 441b in this embodiment. The cylinder case 441a is provided with plural ports 4a to 4h through which the inside and the outside of the cylinder case 441a are in communication.

The port 4a is connected to the conduit 431a. The port 4b is connected to the conduit 422. The port 4c is connected to the conduit 163. The port 4d is connected to the conduit 161 via the conduit 411. The port 4e is connected to a conduit 424, which is connected to the conduit 422 via a relief valve 423. The port 4f is connected to the conduit 413. The port 4g is connected to the conduit 421. The port 4h is connected to a conduit 511, which is diverged from the conduit 51.

The ball valve 442 is a valve having a ball shape at an end portion thereof. The ball valve 442 is provided within the cylinder 441 at a location closer to the bottom surface of the cylinder case 441a (which will be hereinafter referred to also as a cylinder bottom surface side). The biasing portion 443 is a spring member biasing the ball valve 442 towards the opening of the cylinder case 441a (which will be hereinafter referred to also as a cylinder opening side), and is provided at the bottom surface of the cylinder case 441a. A through passage 444a through which the divided cylinder opening side and the cylinder bottom surface side are in communication is formed at a center of the valve seat portion 444. The valve seat portion 444 supports the ball valve 442 from the cylinder opening side by closing the through passage 444a by the biased ball valve 442.

A space defined by the ball valve 442, the biasing portion 443, the valve seat portion 444, and a portion of the inner circumferential surface of the cylinder case 441a positioned closer to the cylinder base surface is referred to as a first chamber 4A. The first chamber 4A is filled with the operation fluid. The first chamber 4A is connected to the conduit 431a via the port 4a and to the conduit 422 via the port 4b.

The control piston 445 includes a main body portion 445a formed in a substantially columnar shape and a projection portion 445b formed in a substantially columnar shape having a smaller diameter than the main body portion 445a. The main body portion 445a is provided inside the cylinder 441 in a coaxial and fluid-tight manner relative to the cylinder opening side of the valve seat portion 444, while allowing the main body portion 445a to be slidably movable in the axial direction. The main body portion 445a is biased towards the cylinder opening by means of a biasing member, which is not illustrated in FIG. 2. A passage 445c is formed at a substantially intermediate portion of the main body portion 445a in the cylinder axial direction. The passage 445c extends in the radial direction (in an up-and-down direction in FIG. 2) so that both end portions thereof open at a circumferential surface of the main body portion 445a. A portion of an inner circumferential surface of the cylinder 441 corresponding to the location of the opening of the passage 445c is provided with the port 4d and is formed to recess so as to form a third chamber 4C together with the main body portion 445a.

The projection portion 445b projects towards the cylinder base surface from a center portion of an end surface of the main body portion 445a facing the cylinder base surface. The projection portion 445b is formed so that the diameter thereof is smaller than the diameter of the through passage 444a of the valve seat portion 444. The projection portion 445b is coaxially provided relative to the through passage 444a. An end portion of the projection portion 445b is spaced apart from the ball valve 442 towards the cylinder opening by a predetermined distance. A passage 445d is formed at the projection portion 445b so that the passage 445d extends in the cylinder axial direction and opens at a center portion of an end surface of the projection portion 445b facing the cylinder base surface. The passage 445d extends to the inside of the main body portion 445a and is connected to the passage 445c.

A space defined by the end surface of the main body portion 445a facing the cylinder bottom surface, an outer surface of the projection portion 445b, the inner circumferential surface of the cylinder 441, the valve seat portion 444, and the ball valve 442 is referred to as a second chamber 4B. The second chamber 4B is in communication with the ports 4d and 4e via the passages 445c and 445d and the third chamber 4C.

The sub-piston 446 includes a sub main body portion 446a, a first projection portion 446b, and a second projection portion 446c. The sub main body portion 446a is formed in a substantially column shape. The sub main body portion 446a is provided within the cylinder 441 in the coaxial and fluid-tight manner relative to the cylinder opening side of the main body portion 445a while allowing the sub main body portion 446a to be slidably movable in the axial direction.

The first projection portion 446b is formed in a substantially columnar shape having a smaller diameter than the sub main body portion 446a and projects from a center portion of an end surface of the sub main body portion 446a facing the cylinder base surface. The first projection portion 446b contacts an end surface of the main body portion 445a facing the cylinder opening. The second projection portion 446c is formed in the same shape as the first projection portion 446b. The second projection portion 446c projects from a center portion of an end surface of the sub main body portion 446a facing the cylinder opening. The second projection portion 446c contacts the cover member 441b.

A space defined by the end surface of the sub main body portion 446a facing the cylinder base surface, an outer surface of the first projection portion 446b, an end surface of the control piston 445 facing the cylinder opening, and the inner circumferential surface of the cylinder 441 is referred to as a pressure control chamber 4D. The pressure control chamber 4D is in communication with the pressure decreasing valve 41 via the port 4f and the conduit 413, and with the pressure increasing valve 42 via the port 4g and the conduit 421.

A space defined by the end surface of the sub main body portion 446a facing the cylinder opening, an outer surface of the second projection portion 446c, the cover member 441b, and the inner circumferential surface of the cylinder 441 is referred to as a fourth chamber 4E. The fourth chamber 4E is in communication with the port 11g via the port 4h and the conduits 511, 51. Each of the chambers 4A through 4E is filled with the operation fluid. The pressure sensor 74 is a sensor that detects the servo hydraulic pressure (driving hydraulic pressure) to be supplied to the servo chamber 1A and is connected to the conduit 163 (See FIG. 1). The pressure sensor 74 sends the detection signal to the brake ECU 70. The function and the operation of the servo hydraulic pressure generating device 4 will be explained hereinafter at an operation mode (operating state) in more detail.

Returning to FIG. 1, the port 11g of the first pressure chamber 1D and the port 11i of the second pressure chamber 1E which generate the master cylinder hydraulic pressure are in communication with the hydraulic pressure control portion 5 via the conduits 51, 52. Further, the hydraulic pressure control portion 5 is in communication with wheel brake cylinders 541 through 544 which form a hydraulic brake device in each of the vehicle wheels 5FR through 5RL.

The hydraulic pressure control portion 5 will be explained here particularly to the one which is associated with the vehicle wheel (5FR). The structure of this portion 5 is similar to the other hydraulic pressure control portions 5 associated with the remaining vehicle wheels and the explanation thereof will be omitted. The hydraulic pressure control portion 5 is structured by a holding valve 531, a pressure decreasing valve 532, a reservoir 533, a pump 534, and a motor 535. The holding valve 531 is a normally-open-type electromagnetic valve opened when not energized and the opening and closing operation is controlled by the brake ECU 70. The holding valve 531 is arranged so that one side is connected to the conduit 52 and the other side is connected to the wheel cylinder 541 and the pressure decreasing valve 532.

The pressure decreasing valve 532 is a normal close type electro-magnetic valve closed when not energized and the opening and closing operation is controlled by the brake ECU 70. The pressure decreasing valve 532 is connected to the wheel cylinder 541 and the holding valve 531 at one side and is connected to the reservoir 533 at the other side. When the pressure decreasing valve 532 is opened, fluid communication between the wheel cylinder 541 and the reservoir 533 is established. The reservoir 533 is a tank for reserving therein the operation fluid and is in communication with the conduit 52 via the pressure decreasing valve 532 and the pump 534.

The pump 534 is connected to the reservoir 533 at the suction port and the discharge port is connected to the conduit 52 via a one-way valve "z". It is noted here that the one-way valve "z" allows the flow from the pump 534 to the second pressure chamber 1E via the conduit 52, but restricts the flow in opposite direction. The pump 534 is driven by the motor 535 which is actuated by a command from the brake ECU 70. The pump 534 suctions the operation fluid stored in the reservoir 533 or in the wheel cylinder 541 and returns the operation fluid to the second pressure chamber 1E under the pressure decreasing mode of the ABS control. It is noted that a damper chamber (not shown) is provided in the discharge side of the pump 534 to dampen the pulsation of the operation fluid discharged by the pump 534.

The hydraulic pressure control portion 5 includes a vehicle wheel speed sensor 76 which detects the vehicle wheel speed at each of the vehicle wheels 5FR through 5RL 53. The vehicle wheel speed sensor 76 sends the detection signal to the brake ECU 70.

According to the hydraulic pressure control portion 5 having the above-described configuration, the hydraulic pressure control portion 5 controls switching of the opening/closing of each of the holding valve 531 and the pressure decreasing valve 532 on the basis of the master cylinder pressure, the vehicle wheel speed, and an acceleration speed which is the value of differentiation of the vehicle wheel speed and activates the motor 535 if necessary. Thus, the hydraulic pressure control portion 5 adjusts the brake hydraulic pressure applied to the wheel cylinder 541, i.e. the hydraulic pressure braking force applied to the wheel 5FR. The brake ECU 70 can execute ABS control (Anti-Lock Brake Control) and ESC control (Electric Stability Control) by adjusting the hydraulically pressurized operation fluid to be supplied to each of the vehicle wheels 5FR through 5RL individually.

The brake ECU 70 is an electronic control unit housing a microprocessor inside thereof and is operated by a software. The brake ECU 70 receives the detection signals from the various sensors 711 through 713 and 73 through 76 and controls the electro-magnetic valves 22, 23, 41, 42, the motor 433 and the hydraulic pressure control portion 5. Further, the brake ECU 70 is connected to a hybrid ECU (not shown) which is a higher order control device for comprehensively controlling the running performance of a hybrid vehicle and the hybrid ECU and the brake ECU 70 mutually change information and instructions and responses.

The brake ECU 70 memorizes two operation modes, a "linear mode" and a "regulator mode" as the operation mode of the master cylinder device 100 which is the subject of controlling. The "linear mode" corresponds to the driving hydraulic pressure operating state of the present invention and is mode of the hydraulic pressure braking control selected when the vehicle is running under a normal state. Under the linear mode, when the braking force corresponding to the operation amount of the brake pedal 10 cannot be sufficiently generated only by the regeneration brake device, the first and the second master pistons 14 and 15 are operated by the servo hydraulic pressure generating device 4 thereby to generate the hydraulic pressure braking force supplementing the insufficient amount of braking force. On the other hand, the "regulator mode" corresponds to the operation force operating state of the present invention and is a mode of the hydraulic pressure braking control selected when the vehicle is stopped. Under the regulator mode, the separation chamber 1B is closed and each of the pistons 13, 14 and 15 are driven by the operation force of the operator of the vehicle thereby to generate hydraulic pressure braking force. The two modes will be explained in more detail hereinafter.

In the "linear mode", the brake ECU energizes the separation lock valve 22 to open and energizes the reaction force valve 23 to close. Due to the closure of the reaction force valve 23, the communication between the reaction force chamber 1C and the reservoir 171 is interrupted and due to the opening of the separation lock valve 22, the communication between the reaction force chamber 1C and the reservoir 171 is established. Then the reaction force generating device 2 generates the reaction force hydraulic pressure in response to the stroke amount in the separation chamber 1B and the reaction force chamber 1C.

In the linear mode, when the brake pedal 10 is not depressed, the ball valve 442 of the servo hydraulic pressure generating device 4 keeps the through passage 444a of the valve seat to be closed. Further, the pressure decreasing valve 41 is in an open state and the pressure increasing valve 42 is in a closed state thereby interrupting the communication between the first chamber 4A and the second chamber 4B. The second chamber 4B is in communication with the servo chamber 4A via the conduit 163 to keep the hydraulic pressure in the two chambers to be mutually in an equal level. The second chamber 4B is in communication with the third chamber 4C via the passages 445c and 445d of the control piston 445, and further is in communication with the reservoir 171 via the conduits 414 and 161. One side of the pressure control chamber 4D is closed by the pressure increasing valve 42 and the other side is connected to the reservoir 171 and the second chamber 4B through the pressure decreasing valve 41. The fourth chamber 4E is in communication with the first pressure chamber 1D via the conduits 511 and 51 and the hydraulic pressure in the two chambers 4E and 1D are kept to the same hydraulic pressure level. Thus, there is no servo hydraulic pressure generated in the servo chamber 1A and no master cylinder hydraulic pressure generated in the first pressure chamber 1D.

Under this state, when the brake pedal 10 is depressed, the input piston 13 advances to interrupt the communication with the passage 18. Thus, the communication between the reservoir 171 and the separation chamber 1B is interrupted. On the other hand, the brake ECU 70 and the hybrid ECU control the braking operation using the regeneration brake device on a priority basis. In other words, the brake ECU 70 calculates a target amount of regeneration (a target regeneration amount) and outputs the target regeneration amount to the hybrid ECU. The hybrid ECU then calculates an executing regeneration amount (executing regeneration amount) relative to the target regeneration amount and outputs the calculated result to the brake ECU 70. The brake ECU 70 subtracts the regeneration braking force corresponding to the executing regeneration amount from a target braking force thereby to calculate a deficient braking force and then the brake ECU 70 controls the hydraulic pressure brake device to generate a hydraulic pressure braking force to supplement the deficiency.

Upon the opening of the pressure increasing valve 42, the communication between the accumulator 431 and the pressure control chamber 4D is established. Upon the closing of the pressure decreasing valve 41, the communication between the accumulator 431 and the pressure control chamber 4D is interrupted. The hydraulic pressure in the pressure control chamber 4D can be raised by the high pressure operation fluid supplied from the accumulator 431. As the hydraulic pressure in the pressure control chamber 4D increases, the control piston 445 is slidably moved towards the cylinder bottom surface side. Then due to such movement of the control piston 445, the tip end of the projection portion 445b of the control piston 445 is brought into contact with the ball valve 442 to close the passage 445d by the ball valve 442. Thus the communication between the second chamber 4B and the reservoir 171 is interrupted.

Further slidable movement of the control piston 445 towards the cylinder bottom surface side pushes the ball valve 442 towards the cylinder bottom surface side by the projection portion 445b to separate the ball valve 442 from the valve seat portion 444. This will allow communication between the first chamber 4A and the second chamber 4B through the through passage 444a of the valve seat portion 444. A high pressure operation fluid is supplied to the first chamber 4A from the accumulator 431 and the hydraulic pressure in the second chamber 4B which is in communication with the first chamber 4A is also increased.

As the pressure in the second chamber 4B increases, the servo hydraulic pressure (driving hydraulic pressure) in the servo chamber 1A which is in communication with the second chamber 4B increases accordingly. Due to the increase of the servo hydraulic pressure, the first master piston 14 advances and the master cylinder hydraulic pressure in the first pressure chamber 1D increases by the advance movement of the first master piston 14. Then the second master piston 15 is also advances to increase the master cylinder hydraulic pressure in the second pressure chamber 1E. By this increase of the master cylinder hydraulic pressure, the high pressure operation fluid is supplied to the wheel cylinders 541 through 544 via the conduits 51 and 52 and the hydraulic pressure control portion 5 to apply hydraulic pressure braking force to the corresponding vehicle wheels 5FR through 5RL.

Further, the master cylinder hydraulic pressure in the first pressure chamber 1D is fed back to the fourth chamber 4E of the servo hydraulic pressure generating device 4 and accordingly, the pressure in the fourth chamber 4E increases to be balanced with the pressure in the pressure control chamber 4D thereby not to move the sub piston 446 by this pressure balance. Thus, the hydraulic pressure braking force can be generated which supplements the deficient braking force based on the servo hydraulic pressure created by the high pressure operation fluid from the accumulator 431. It is noted here that the separation distance "d" between the input piston 13 and the first master piston 14 is variably changed.

If the generation of the hydraulic pressure braking force is desired to be released, the pressure decreasing valve 41 is set to be in an open state and the pressure increasing valve 42 is set to be in a closed state. Then the pressure control chamber 4D is connected to the reservoir 171 thereby retreating the control piston 445. By this retreatment of the control piston 445, the servo hydraulic pressure generating device 4 returns to the state where the brake pedal 10 is not depressed.

On the other hand, in the regulator mode, the brake ECU 70 de-energizes the electromagnetic valves, pressure decreasing valve 41, pressure increasing valve 42, separation lock valve 22 and reaction force valve 23. In addition, if the electromagnetic valves are in non-energized state due to a failure of the system, the mode automatically changed to the regulator mode. Such non-energized state is kept even after the brake pedal 10 is depressed.

In the regulator mode, when the brake pedal 10 is depressed, the input piston 13 advances to interrupt communication with the passage 18 thereby to interrupt communication between the separation chamber 1B and the reservoir 171. Under this state, due to the closed state of the separation lock valve 22, the separation chamber 1B is in a closed state. The reaction force chamber 1C is in communication with the reservoir 171 through the reaction force valve 23 which is in an open state.

Further depression of the brake pedal 10 by the operator of the vehicle advances the input piston 13 thereby to increase the pressure in the separation chamber 1B and the first master piston 14 advances keeping the constant separation distance "d" with the input piston 13. The servo hydraulic pressure is not generated at this stage due to the non-energized state of the pressure decreasing valve 41 and the pressure increasing valve 42. In other words, the first master piston 14 advances only by the hydraulic pressure in the separation chamber 1B, which corresponds to the operation force of the brake pedal 10. This will increase the volume of the servo chamber 1A and the operation fluid is supplemented from the reservoir 171 through the regulator 44.

When the first master piston 14 advances, as similar to the linear mode, the master cylinder hydraulic pressure in the first pressure chamber 1D and the second pressure chamber 1E increases. By this pressure increase, the high pressure operation fluid is supplied to the wheel cylinders 541 through 544 via the conduits 51 and 52 and the hydraulic pressure control portion 5 to apply hydraulic pressure braking force to the vehicle wheels 5FR through 5RL.

Further, the master cylinder hydraulic pressure in the first pressure chamber 1D is fed back to the fourth chamber 4E of the servo hydraulic pressure generating device 4 and accordingly, the pressure in the fourth chamber 4E increases to move the sub piston 446 towards the cylinder bottom surface side. At the same time, the control piston 445 is pushed by the first projection portion 446b to slidably move towards the cylinder bottom surface side. Then the projection portion 445b is brought into contact with the ball valve 442 and the ball valve 442 is then pushed towards the cylinder bottom surface side. In other words, the first and the second chambers 4A and 4B are in communication with each other but the communication between the servo chamber 1A and the reservoir 171 is interrupted and the high pressure operation fluid is introduced into the servo chamber 1A from the accumulator 431.

Under the regulator mode, if the brake pedal 10 is depressed to a predetermined amount, the fed back master cylinder hydraulic pressure establishes the communication between the accumulator 431 of the servo hydraulic pressure generating device 4 and the servo chamber 1A to increase the servo hydraulic pressure. Then the servo hydraulic pressure in the servo chamber 1A is added to the hydraulic pressure in the separation chamber 1B corresponding to the operation force by the operator of the vehicle to drive the first master piston 14. This means the assisting function is achieved to assist the operation force by the operator of the vehicle. It is noted that under such stage, the input piston 13 and the first master piston 14 are driven keeping substantially the constant distance "d".

Next, functional means of the braking control device according to the invention will be explained hereinafter. Each function of the operation control means, the brake operation judgment means and the state transition limiting means is carried out by using software operable on the brake ECU 70.

The operation control means controls selecting of the operation mode of the master cylinder device 100 to either the regulator mode (operation force operating state) or the linear mode (driving hydraulic pressure operating state). The basic control operation of the operation control means is that the operation mode of the master cylinder device 100 is selected to the regulator mode when the vehicle speed detected by the vehicle wheel sensor 76 is equal to or less than a very slow value of "A" km/h and is selected to the linear mode when the vehicle speed exceeds the value "A". it is noted that the judgment value "A" km/h is the vehicle speed where the vehicle is substantially stopped. The operation control means selects the operation mode by controlling the energization state of the separation lock valve 22, the reaction force valve 23 and the pressure decreasing valve 41 and the pressure increasing valve 42 of the servo hydraulic pressure generating device 4.

The brake operation judgment means judges whether the brake pedal 10 is being depressed or not, and if the pedal is not depressed now, further judges the probability of whether an operation of the brake pedal 10 is performed within a predetermined time period. In more detail, the brake operation judgment means judges using the detection signals received from at least one of the stroke sensor 711 and the brake switch 712. The brake operation judgment means further judges that the probability of brake pedal operation within the predetermined time period exists by judging that the courtesy switch 713 outputs the detection signal that the door is in closed state immediately after the brake ECU 70 is activated.

The state transition limiting means limits the mode change at least one of the state change from the regulator mode to the linear mode and the state change from the linear mode to the regulator mode to be performed by the operation control means, if the brake operation judgment means judges at least one of the judgment that the brake pedal 10 is being depressed and the judgment that the probability of brake pedal operation within the predetermined time period exists. In more detail, the state transition limiting means limits the mode change from the regulator mode to the linear mode when judged that the probability of brake pedal depression operation exists immediately after the brake ECU 70 is activated. Further, the state transition means limits both mode changes when the vehicle is running or is temporarily stopped. The limiting of the operation mode change by the state transition means precedes the selection operation of the operation mode responding to the vehicle speed.

Next, the operations of the respective function means in thus structured master cylinder device 100 and the braking control device (brake ECU 70) will be explained hereinafter. FIG. 3 is a process flowchart explaining the operation of the braking control device according to the first embodiment of the invention. The process of the flowchart is repeatedly performed with "ms" (millisecond) level cycle time. In FIG.

3, at the step S0, when the brake ECU 70 is activated, the process flow starts. The condition that the brake ECU 70 is activated includes any of the state change of the courtesy switch 713 by door opening operation, the state change of the stroke sensor 711 or the brake switch 712 by brake pedal operation or ignition switch ON operation.

At the next step S1, whether or not the current state is immediately after the activation of the brake ECU 70 is judged. If the state is immediately after the activation of the brake ECU 70 ("Yes"), the program goes to the step S2 and if the state is other than immediately after the activation ("No"), the program goes to the step S11. At the step S2 where the state is judged to be the state immediately after the activation, the master cylinder device 100 is in the initial state "regulator mode". At the step S3, the brake operation judgment means confirms the state of door whether opening or closing based on the detection signal from the courtesy switch 713. In other words, when the door is in the open state, the brake operation judgment means judges that there will be no probability that the braking operation will be performed within the predetermined time period and the program goes to the step S4. However, when the door is in the closed state, the brake operation judgment means judges that there will be a probability that the braking operation will be performed within the predetermined time period and the program goes to the step S5 to keep the regulator mode by limiting the state transition from the regulator mode to the linear mode by the state transition limiting means. If in the case that the brake ECU 70 is activated by the braking operation at the step S0, the program goes to the step S5 from the step S3 regardless of the door state by limiting the state transition from the regulator mode to the linear mode by the state transition limiting means.

At the step S4, since the mode transition is not limited, the operation control means starts energization of the separation lock valve 22 and the reaction force valve 23 thereby changing the mode of the master cylinder device 100 from the regulator mode to the linear mode. On the other hand, since the mode transition is limited at the step S5, the operation control means does not start energization of the separation lock valve 22 and the reaction force valve 23 thereby keeping the regulator mode of the master cylinder device 100. One cycle of process ends at the step S4 or the step S5.

At the step S11 where the state of the activation of the brake ECU is not the state immediately after the activation, the operation control means confirms that the current operation mode and if the operation mode is in the linear mode, the program goes to the step S12 and if the mode is in the regulator mode, the program goes to the step S16. At the step S12, the brake operation judgment means judges from at least one of the detection signals from the stroke sensor 711 and the brake switch 712 that the braking operation is being performed or not. If the braking operation is being performed, the mode from the linear mode to the regulator mode is limited by the state transition limiting means and the program goes to the step S14. If the braking operation is not performed, the program goes to the step S13. At this step S13, since the mode transition is not limited by the state transition limiting means, the operation control means performs the selection of mode based on the vehicle speed.

In other words, at the step S13, when the vehicle speed exceeds the slow value of "A" km/h, the operation control means selects the linear mode and the program goes to the step S14. However, if the vehicle speed is equal to or less than the slow value of "A" km/h, the operation control means selects the regulator mode and the program goes to the step S15. At the step S14, the operation control means keeps the master cylinder device 100 to be in the linear mode and at the step S15, the operation control means changes the operation mode of the master cylinder device 100 to the regulator mode.

Further, at the step S16 where the master cylinder device 100 is in the regulator mode, the brake operation judgment means judges whether the braking operation is being performed or not. If the braking is judged to be in operation, the state transition limiting means limits the mode change from the regulator mode to the linear mode and the program goes to the step S18. If the braking is judged to be not in operation the program goes to the step S17. At the step S17, since the state transition limiting means does not limit the mode change, the operation control means performs the mode selection based on the vehicle speed.

In other words, at the step S17, if the vehicle speed is equal to or less than the slow value of "A" km/h, the operation control means selects the regulator mode and the program goes to the step S18. However, if the vehicle speed exceeds the slow value of "A" km/h, the operation control means selects the linear mode and the program goes to the step S19. At the step S18, the operation control means keeps the master cylinder device 100 to be in the regulator mode and at the step S19, the operation control means changes the operation mode of the master cylinder device 100 to the linear mode. One cycle of process ends at any of the steps S14, S15, S18 and S19.

Next, the operation and advantageous effects according to the braking control device of the first embodiment of the invention will be explained by comparison with those of the conventional device. Assuming that the vehicle is started with a foot of an operator of the vehicle placed on the brake pedal 10 under a conventional technology, when the brake ECU 70 is activated and the supply of the electric power from the power source to the master cylinder device 10 is started, the operation mode is changed from the regulator mode to the linear mode. Then the separation chamber 1B becomes in open state by the opening of the separation lock valve 22. The operation fluid in the separation chamber 1B flows into or from the reaction force chamber 1C through the chamber to chamber communication passage (conduits 162 and 164). Accordingly, a rigidity feeling during braking operation will be suddenly deteriorated.

Figure 3:
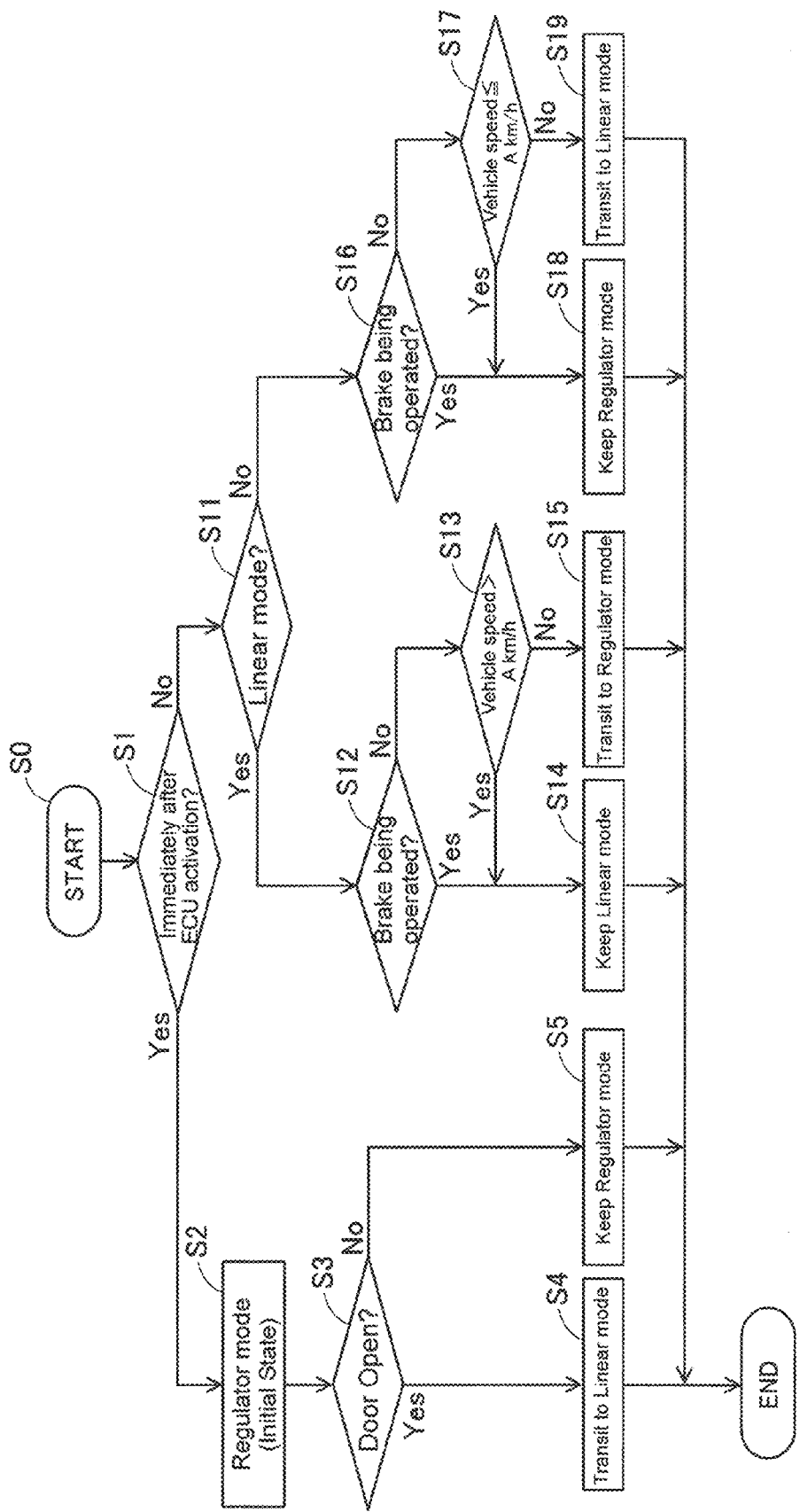
FIG. 3 is a flowchart explaining the operation of the braking control device according to the first embodiment.

To this operation of the conventional device, according to the first embodiment of the invention, at the steps S3 and S5 in FIG. 3, if the door is in closed state immediately after the activation of the brake ECU 70, the state transition from the regulator mode to the linear mode is limited. In other words, the probability of performing of braking operation before starting moving of the vehicle is expected and the regulator mode is kept to suppress occurrence of rigidity reduction of the braking feeling. This can improve a brake pedal depression feeling for the operator of the vehicle. After the operator of the vehicle release the foot from the brake pedal 10, the mode is changed from the regulator mode to the linear mode and accordingly, the regeneration efficiency of the regeneration brake device would not be deteriorated.

Assuming that the brake pedal 10 is depressed to make a temporal stopping due to the red traffic signal while the vehicle is running according to the conventional technology, the mode is changed from the linear mode to the regulator mode to have the separation chamber 1B to be closed by the closing of the separation lock valve 22. Accordingly, in-flow and out-flow of the operation fluid in the separation chamber 1B is prevented to cause a sudden increase of rigidity feeling of the brake pedal 10 operation.

To this operation of the conventional device, according to the first embodiment of the invention, as explained in FIG. 3, at the steps S12 and S14, if the braking operation is being performed, the state transition from the linear to the regulator mode is limited. This can improve a brake pedal 10 depression feeling by preventing a sudden rigidity increased feeling.

Further, according to the first embodiment of the invention, the master cylinder hydraulic pressure in the first pressure chamber 1D is fed back to the fourth chamber 4E of the servo hydraulic pressure generating device 4. Still further, the servo hydraulic pressure generating device 4 can supply the servo chamber 1A with the servo hydraulic pressure (driving hydraulic pressure) corresponding to the master cylinder hydraulic pressure, or in other words, the servo hydraulic pressure in response to the depression amount of the brake pedal 10 during the regulator mode operation. As is different from the conventional technology, the driving of the first and the second master pistons can be assisted by using the servo hydraulic pressure generating device 4 even during the regulator mode operation thereby to improve responsibility of braking force.

It is noted here that instead of using feed-back supply of the master cylinder hydraulic pressure, hydraulic pressure in response to the brake pedal 10 depression amount may be generated in the fourth chamber 4E of the servo hydraulic pressure generating device 4 by controlling the high pressure supply portion 43, the pressure decreasing valve 41 and the pressure increasing valve 42. This modified structure also has the same or similar operation and the advantageous effects.

Second Embodiment

Figure 4:
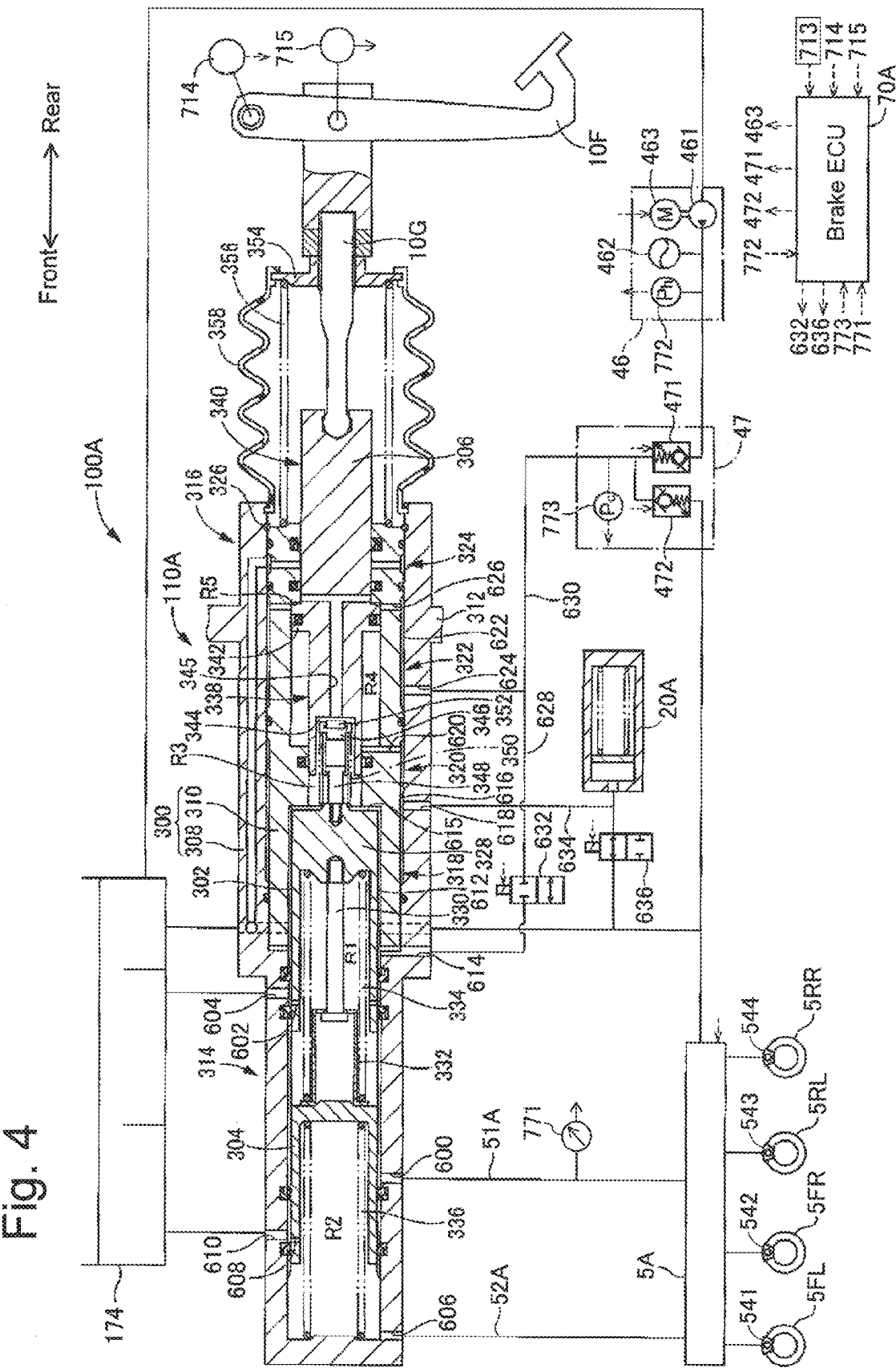
FIG. 4 is a view explaining the general structure of the master cylinder device including the braking control device according to a second embodiment of the invention.

Next, the second embodiment of the braking control device according to the invention which structure is different in structure of the master cylinder device 100A will be explained with reference to FIG. 4. FIG. 4 is a view explaining the general structure of the master cylinder device 100A including the braking control device according to the second embodiment of the invention. The master cylinder device 100A is installed in the hybrid type vehicle and forms the brake system for a hybrid vehicle together with the regeneration brake device (not shown).

The master cylinder device 100A includes a master cylinder 110A for pressurizing the operation fluid. The operator of the vehicle depresses the brake pedal 10F which is connected to the master cylinder 110A to operate the same. The master cylinder 110A generates the master cylinder hydraulic pressure by pressurizing the operation fluid therein and thus generated master cylinder hydraulic pressure is supplied to the hydraulic pressure control portion 5A. The hydraulic pressure control portion 5A adjustably controls the hydraulic pressure in respective vehicle wheels 5FR to 5RL and adjusted hydraulic pressure is supplied to the respective wheel cylinders 541 to 544 which form the hydraulic pressure brake device.

The brake pedal 10F which corresponds to the brake operation member of the invention is held on the vehicle body and is swingable relative thereto. The brake pedal 10F is connected to the input piston 306 through an operation rod 10G. The brake pedal is provided with an operation amount sensor 714 for detecting the operation amount of the brake pedal 10F and an operation force sensor 715 for detecting the operation force. The operation amount sensor 714 and the operation force sensor 715 send the detected results to the brake ECU 70A.

The hydraulic pressure control portion 5A is connected to the master cylinder 110A via hydraulic passages 51A and 52A. A pressure sensor 771 is provided in the passage 52A and the pressure sensor 771 sends the detection signal to the brake ECU 70A. The structure and the function of the hydraulic pressure control portion 5A are approximately the same with those of the hydraulic pressure control portion 5 of the first embodiment and therefore, no detail thereof will be explained.

The high pressure source device 46 and the pressure increase decrease device 47 correspond to the driving hydraulic pressure generating portion of the invention. The high pressure source device 46 is connected to the master cylinder 110A through the pressure increase decrease device 47. The pressure increase decrease device 47 is a device for controlling the operation fluid, which pressure has been raised to a highly pressurized level by the operation fluid by the high pressure source device 46. The pressure increase decrease device 47 controls to decrease or increase the driving hydraulic pressure of the operation fluid supplied to the master cylinder 110A. Further, a reservoir 174 is provided at the master cylinder device 100A which reserves operation fluid under the atmospheric pressure as a low pressure source. The reservoir 174 is connected to the master cylinder 110A, pressure increase decrease device 47 and the high pressure source device 46.

The high pressure source device 46 includes a hydraulic pressure pump 461 which suctions the operation fluid from the reservoir 174 and pressurizes the suctioned operation fluid and an accumulator 462 which accumulates the pressurized operation fluid therein. The hydraulic pressure pump 461 is driven by an electric motor 463. The high pressure source device 46 is further provided with a pressure sensor 772 which detects the hydraulic pressure of the operation fluid which has been highly pressurized. The pressure sensor 772 sends the detection signal to the brake ECU 70A. The brake ECU 70A drives the motor 463 when the hydraulic pressure in the high pressure source device 46 becomes equal to or less than a predetermined pressure level and drives the hydraulic pressure pump 461 to recover the hydraulic pressure in the high pressure source device 46 to be equal to or more than the predetermined pressure level when the hydraulic pressure drops to the level less than the predetermined pressure level. Accordingly, the high pressure source device 46 always supply the pressure increase decrease device 47 with the operation fluid pressurized to the pressure level equal to or more than the predetermined level.

The pressure increase decrease device 47 includes an electromagnetic type pressure increasing linear valve 471 which increases the driving hydraulic pressure and an electromagnetic type pressure decreasing linear valve 472 which decreases the driving hydraulic pressure. The pressure increasing linear valve 471 is provided in a hydraulic passage way hydraulically connecting the high pressure source device 46 with the master cylinder 110A, while the pressure decreasing linear valve 472 is provided in a hydraulic passage way hydraulically connecting the reservoir 174 with the master cylinder 110A. It is noted that the hydraulic passage ways from the pressure increasing linear valve 471 and the pressure decreasing linear valve 472 to the master cylinder 110A are commonly formed to be a hydraulic passage and a pressure sensor 773 is provided in the commonly formed hydraulic passage. The pressure sensor 773 sends the detection signal to the brake ECU 70A.

The pressure increasing linear valve 471 is in a closed state under a non-energized and non-excited state and is in an open state under an energized excited state. The valve opening pressure becomes high when the current supplied thereto is large. The pressure decreasing linear valve 472 is in an open state under a non-energized and non-excited state and is in a closed state under an energized excited state. The valve opening pressure becomes low when the current supplied thereto is small.

The master cylinder 110A is formed by a housing 300, a first pressurizing piston 302, a second pressurizing piston 304 and an input piston 306. It is noted that the state showing in FIG. 4 is that the master cylinder 110A is not operated, i.e., the state that no braking operation is performed.

The housing 300 is mainly formed by a first housing member 308 and a second housing member 310. The first housing member 308 is formed to be of approximately cylindrical shape and front end thereof being closed and an outer peripheral portion of a rear end being provided with a flange 312 by which the first housing member 308 is fixed to a vehicle body. The first housing member 308 is formed by a front side small diameter portion 314 and a rear side large diameter portion 316 which have mutually different inner diameters.

The second housing member 310 is formed with a front large diameter portion 318, a front small diameter portion 320, a rear large diameter portion 322 which diameter is slightly smaller than the diameter of the front large diameter portion 318 and a rear small diameter portion 324 in order from the front side to the rear side. The second housing member 310 is of a cylindrical shape. The second housing member 310 is inserted into the rear side large diameter portion 316 under the front portion thereof being in contact with a stepped surface formed between the front side small diameter portion 314 and the rear side large diameter portion 316 of the first housing member 308. A lock ring 326 is disposed at an inner peripheral surface of the rear portion of the first housing member 308 for connecting the first housing member 308 and the second housing member 310.

The second pressurizing piston 304 is of a cylindrical shape having a bottom wall at a rear end portion to close the cylinder and is slidably engageably inserted into the front side small diameter portion 314 of the first housing member 308. The first pressurizing piston 302 is provided rearward of the second pressurizing piston 304 and is of a cylindrical shape having a bottom wall at a rear end portion to close the cylinder. A first pressure chamber R1 is defined between the first and the second pressurizing pistons 302 and 304 at a front of the first pressurizing piston 302. A second pressure chamber R2 is defined also between the first and the second pressurizing pistons 302 and 304 at a front of the second pressurizing piston 304. The length of the separation distance between the first and the second pressurizing pistons 302 and 304 is limited by a pin with a head 330 screwed in and projects upright from a bottom portion 328 of the first pressurizing piston 302 and a pin holding cylinder 332 fixed on the rear end surface of the second pressurizing piston 304.

Compression springs 334 and 336 are respectively provided in the first and the second pressure chambers R1 and R2. The first and the second pressurizing pistons 302 and 304 are biased by the compression springs 334 and 336 so that the two pistons 302 and 304 are separating from each other and at the same time biased in the rear direction. The rearward movement of the first pressurizing piston 302 is restricted so that the rear surface thereof is brought into contact with a stepped surface formed between the front side large diameter portion 318 and the front side small diameter portion 320 of the second housing member 310.

The input piston 306 includes a front side front small outer diameter portion 338 and a rear side rear large outer diameter portion 340. The input piston 306 is of a stepped columnar shape. A flange portion 342 is provided between the front small outer diameter portion 338 and the rear large outer diameter portion 340. A hole 344 formed in a bottom and opening frontward is provided at a front end of the axial center of the front small outer diameter portion 338. The input piston 306 is inserted into the second housing member 310 under the state that the front small outer diameter portion 338 is in slidable contact with the inner peripheral surface of the front small diameter portion 320, the flange portion 342 is in slidable contact with the inner peripheral surface of the rear large diameter portion 322 and the rear outer large diameter portion 340 is in slidable contact with the inner peripheral surface of the rear small diameter portion 326.

A separation chamber R3 is defined between the rear end surface of the first pressurizing piston 302 and the hole 344 in the bottom of the input piston 306. A tubular rear chamber is defined between the input piston 306 and the second housing member 310. The rear chamber is separated in front and rearward direction by the flange portion 342 of the input piston 306 and an annular reaction force chamber R4 is defined in front portion while an annular rear back chamber R5 is defined in rear portion. The rear back chamber R5 is shown to be almost in compressed state in FIG. 4. It is noted that the input piston 306 is structured so that the area where the pressurized operation fluid in the separation chamber R3 is applied and the area of the flange portion 342 where the pressurized operation fluid in the rear back chamber R5 is applied are made equal to each other. Further, an inner communication passage 345 is formed inside of the input piston 306. One end of the passage 345 is open to the hole 344 in the bottom and the other end is open to the rear of the flange portion 342. Thus, the separation chamber R3 and the rear back chamber R5 are communicable through this passage 345.

A cylindrical member 346 having a cover portion is held by a pin with a head 348 screwed in and projecting upright from the rear end surface of the first pressurizing piston 302 in the separation chamber R3. The cylindrical member 346 and the pin with head 348 are arranged so that they are penetrating through a compression spring 350 one end of which is held on the rear end surface of the first pressurizing piston 302. The cylindrical member 346 is biased in a rear direction from the first pressurizing piston 302 by the compression spring 350. The length of the separation distance is limited within a predetermined value by the engagement between the detent portion provided at the front end of the cylindrical member 346 and the head of the pin 348. A disc like rubber made closing member 352 is provided at the rear end surface of the cylindrical member 346 to be in an opposed state to the opening of the inner communication passage 345. Thus, communication between the separation chamber R3 and the rear back chamber R5 are interrupted by the closing member 352 which closes the inner communication passage 345 when the input piston 306 advances.

An operation rod 10G is connected between the rear end portion of the input piston 306 and the brake pedal 10F. The operation rod 10G transmits the operation force and operation amount applied on the brake pedal 1 OF to the input piston 306. A disc-like spring support plate 354 is fixed on the outer peripheral portion of the rear portion of the operation rod 10G and a compression coil spring 356 is provided between the spring support plate 354 and the second housing member 310. The operation rod 10G is biased rearward by the compression coil spring 356. A tubular bellow type boots 358 is provided between the spring support plate 354 and the first housing member 308 to cover the rear portion of the master cylinder 110A to prevent entering of dust or any foreign materials.

The first pressure chamber R1 is in communication with a hydraulic passage 51A which is connected to the hydraulic pressure control portion 5A through a communication bore 600 which opening serves as an output port. Further, the first pressure chamber R1 is in communication with the reservoir 174 through the communication bore 602 provided in the first pressurizing piston 302 and the communication bore 604 which opening serves as a drain port. On the other hand, the second pressure chamber R2 is in communication with a hydraulic passage 52A which is connected to the hydraulic pressure control portion 5A through a communication bore 606 which opening serves as an output port. Further, the second pressure chamber R2 is in communication with the reservoir 174 through the communication bore 608 provided in the second pressurizing piston 304 and the communication bore 610 which opening serves as a drain port.

The outer diameter of the first pressurizing piston 302 is formed to be slightly smaller than the inner diameter of the front side large diameter portion 318 of the second housing member 310. A cylindrical hydraulic passage 612 having a certain flow passage area is formed between the first pressurizing piston 302 and the second housing member 310. The hydraulic passage 612 is in communication with the exterior of the cylinder 100A through the communication bore 614 which opening serves as a connecting port. Further, a hydraulic passage 615 is formed by providing a recessed portion at the rear end surface of the first pressurizing piston 302. The hydraulic passage 615 is provided with a certain flow passage area between the rear end surface and a stepped surface of the first pressurizing piston 302 under the state that the first pressurizing piston 302 is in contact with the stepped surface formed by the front side large diameter portion 318 and the front side small diameter portion 320 of the second housing member 310. One end at the outer peripheral side of the hydraulic passage 615 is open to the hydraulic passage 612 and the other end at the inner peripheral side is open to the separation chamber R3 and accordingly, the separation chamber R3 is open to the exterior of the cylinder through the hydraulic passages 615, 612 and communication bore 614.

The portion of the second housing member 310 at a front side has an outer diameter slightly smaller than an inner diameter of the first housing member 308. A cylindrical hydraulic passage 616 having a certain flow passage area is formed between the first and second housing members 308 and 310. The hydraulic passage 616 is in communication with the exterior of the cylinder 100A through the communication bore 618.

The portion of the second housing member 310 at a rear side has an outer diameter slightly smaller than an inner diameter of the first housing member 308. A cylindrical hydraulic passage 622 having a certain flow passage area is formed between the first and second housing members 308 and 310. The hydraulic passage 622 is in communication with the exterior of the cylinder 100A through the communication bore 624 which opening serves as a connecting port. The communication bore 626 is formed in the second housing member 310 and one end thereof being open to the hydraulic passage 622 and the other end thereof being open to the rear back chamber R5. Accordingly, the rear back chamber R5 is open to the exterior of the cylinder through the communication bore 626, hydraulic passage 622 and the communication bore 624.

An external communication passage 628 is provided outside of the housing 300. The external communication passage 628 is connected to the communication bore 614 at one end and is further connected to the communication bore 624 at the other end. The communication passage 628 is connected to the pressure increase decrease device 47 through a driving hydraulic pressure supply passage 630. Accordingly, the operation fluid which is adjusted by the pressure increase decrease device 47 to be the driving hydraulic pressure is supplied to the rear back chamber R5 and the separation chamber R3. An electromagnetic type open/close valve 632 is provided in a portion of the external communication passage 628. The open/close valve 632 is a normally closed valve which becomes in a closed state under a non-excited state.

The driving hydraulic pressure is supplied to the rear back chamber R5 and the separation chamber R3 from the pressure increase decrease device 47 and these chambers function as the driving hydraulic pressure chamber. The external communication passage 628 corresponds to the external communication passage of the invention. Further, the open/close valve 632 corresponds to the chamber to chamber communication passage interrupting device and the separation chamber opening and closing portion of the present invention.

One end of the communication passage 634 which communicates with the reservoir 174 is connected to the connecting port of the communication bore 618. A portion of the communication passage 634 is formed within the first housing member 308. An electromagnetic type open/close valve 636 is provided in apportion of the communication passage 634. The open/close valve is a normally open type valve which is in open under a non-excited state. A stroke simulator 20A is provided between the communication bore 618 of the communication passage 634 and the open/close valve 636. The operation fluid in the reaction force chamber R4 flows into or out from the stroke simulator 20A. The structure and function of the stroke simulator 20A are the same with those of the reaction force generating device 2 according to the first embodiment and therefore, detail explanation thereof will be omitted. A diaphragm type stroke simulator may be used for the stroke simulator 20A.

The brake ECU 70A is an electric control unit which is operated by a microprocessor housed therein. The brake ECU 70A receives various detection signals from the courtesy switch 713, other sensors 714, 715, 771 through 773 and controls each valve 471, 472, 632 and 636, motor 463 and the hydraulic pressure control portion 5A based on the received detection signals.

According to the second embodiment explained above, the brake ECU 70A controls to change the operation mode between the operation mode of the master cylinder device 100A and the regulator mode (operation force operating state) and the linear mode (driving hydraulic pressure operating state). In other words, when the open/close valves 632 and 636, pressure increasing linear valve 471 and the pressure decreasing linear valve 472 are not energized, the master cylinder device 100A is operated under the regulator mode. Under this situation, the open/close valve 632 is closed to close the separation chamber R3. The input piston 306 and the first pressurizing piston 302 are cooperatively moved keeping a constant separation distance therebetween. The driving hydraulic pressure is not generated by the pressure increase decrease device 47 and the input piston 306 and the first pressurizing piston 302 are operated only by the operation force by the operator of the vehicle.

When the open/close valves 632 and 636, pressure increasing linear valve 471 and the pressure decreasing linear valve 472 are energized, the master cylinder device 100A is operated under the linear mode. Under this situation, the open/close valve 632 is open to open the separation chamber R3. The input piston 306 and the first pressurizing piston 302 are independently moved. The driving hydraulic pressure is variably generated by the pressure increase decrease device 47 to be able to obtain a desired hydraulic pressure braking force.

According to the second embodiment, each function means, such as the operation control means, the brake operation judgment means and the state transition limiting means of the braking control device according to the invention will be operated by the software which is operated on the brake ECU 70A. The operation and obtained advantageous results will be similar to those of the first embodiment and explanation thereof will be omitted. It is noted here however, that since the master cylinder hydraulic pressure is not fed back, the assisting function under the regulator mode explained in the first embodiment will not be obtained in this second embodiment.

It is noted that the braking control device according to the invention may be applicable to various types of master cylinder device which are subject to be controlled.

The invention claimed is:

1. A braking control device for controlling a master cylinder device which includes:
 a tubular housing, a front side of which is closed;
 an output piston provided within the housing so that a pressure chamber for pressurizing an operation fluid to be supplied to a hydraulic brake device provided at each vehicle wheel is formed at a front side of the output piston within the housing and defined by the output piston;
 an input piston provided rearward of the output piston within the housing so that a separation chamber is formed at a rear side of the output piston, a rear end portion of the input piston being connected to a brake operation member and the input piston being movable in response to an operation force applied to the brake operation member;
 a separation chamber opening and closing portion which changes over a state of the separation chamber between an open state where the operation fluid can flow in or out from the separation chamber and a closed state where the operation fluid cannot flow in or out from the separation chamber; and
 a driving hydraulic pressure generating portion for generating a driving hydraulic pressure in a driving hydraulic pressure chamber defined by the housing and the output piston, wherein the braking control device includes:
 an operation control means which controls the master cylinder device to be in an operation force operating state, where the output piston is driven together with the input piston by the operation force to have the separation chamber to be in the closed state by the separation chamber opening and closing portion and to be in a driving hydraulic pressure operating state, where the separation chamber is in the open state by the separation chamber opening and closing portion to drive the output piston by generating a driving hydraulic pressure in response to an operation amount of the brake operation member in the driving hydraulic pressure chamber by the driving hydraulic pressure generating portion;
 a brake operation judgment means for judging at least whether or not a braking operation by the brake operation member is being performed, or whether or not the braking operation will be performed within a predetermined time period; and
 a state transition limiting means for limiting at least one of a state transition from the operation force operating state to the driving hydraulic pressure operating state of the master cylinder device and a state transition from the driving hydraulic pressure operating state to the operation force operating state, when the brake operation judgment means judges at least that the braking operation by the brake operation member is being performed or that the braking operation will be performed within the predetermined time period.

2. The braking control device according to claim 1, wherein the state transition limiting means allows at least one of the state transitions from the operation force operating state to the driving hydraulic pressure operating state of the master cylinder device and from the driving hydraulic pressure operating state to the operation force operating state, regardless of a limiting of the state transition being performed or not, when the brake operation judgment means judges at least that the braking operation by the brake operation member is not being performed or that the braking operation will not be performed within the predetermined time period.

3. The braking control device according to claim 1, wherein the driving hydraulic pressure generating portion generates the driving hydraulic pressure in the driving hydraulic pressure chamber in response to the operation amount of the brake operation member when the transition state from the operation force operating state to the driving hydraulic pressure operating state of the master cylinder device is limited by the state transition limiting means to hold the master cylinder device to be in the operation force operating state.

4. The braking control device according to claim 1, wherein the master cylinder device further includes;
 a rear chamber defined by an inner peripheral surface of the housing and the output piston, the rear chamber being defined at a rear part of the pressure chamber; a large diameter flange portion formed on the output piston and arranged in the rear chamber, the large diameter flange portion being slidably movably engaged with the inner peripheral surface of the housing;
 a reaction force chamber disposed at a front of the large diameter portion and formed by separating the rear chamber, the driving hydraulic pressure chamber disposed at a rear part of the large diameter flange portion and formed by separating the rear chamber;
 a chamber to chamber communication passage connecting the separation chamber and the reaction force chamber for absorbing a volume change of the separation chamber and the reaction force chamber in response to an advance movement or a retracting movement of the output piston by transferring of the operation fluid; and
 a chamber to chamber communication passage communication interrupting device which interrupts communication of the chamber to chamber communication passage under non-energized state thereof and establishes communication thereof under energized state thereof.

5. The braking control device according to claim 1, wherein the master cylinder device further includes;
   a rear chamber defined by an inner peripheral surface of the housing and the input piston, the rear chamber being defined at a rear of the separation chamber; a large diameter flange portion formed on the input piston and arranged in the rear chamber, the large diameter flange portion being slidably movably engaged with the inner peripheral surface of the housing;
   a reaction force chamber disposed at a front of the large diameter portion and formed by separating the rear chamber;
   a rear back chamber formed at a rear of the large diameter flange portion by separating the rear chamber;
   a chamber to chamber communication passage connecting the separation chamber and the rear back chamber for absorbing a volume change of the separation chamber and the rear back chamber in response to an advance movement or a retracting movement of the input piston by transferring of the operation fluid; and
   a chamber to chamber communication passage communication interrupting device which interrupts communication of the chamber to chamber communication passage under non-energized state thereof and establishes communication thereof under energized state thereof.

* * * * *